United States Patent
Tsurumi et al.

(10) Patent No.: US 7,722,202 B2
(45) Date of Patent: May 25, 2010

(54) METER HAVING LCD PANEL AND POINTER

(75) Inventors: Shunya Tsurumi, Chiryu (JP); Seigo Tane, Kariya (JP); Satoshi Sugiura, Handa (JP)

(73) Assignee: Denso Corporation, Kariya (JP)

( * ) Notice: Subject to any disclaimer, the term of this patent is extended or adjusted under 35 U.S.C. 154(b) by 80 days.

(21) Appl. No.: 12/264,330

(22) Filed: Nov. 4, 2008

(65) Prior Publication Data

US 2009/0180272 A1     Jul. 16, 2009

(30) Foreign Application Priority Data

Jan. 11, 2008   (JP)   .............................. 2008-004858

(51) Int. Cl.
G01D 11/28 (2006.01)

(52) U.S. Cl. .......................... 362/27; 362/26; 362/489; 362/511; 116/48; 116/288

(58) Field of Classification Search .................... 116/48, 116/49, 286–288, 310; 362/26, 27, 29, 30, 362/489, 511
See application file for complete search history.

(56) References Cited

U.S. PATENT DOCUMENTS

| | | | | |
|---|---|---|---|---|
| 5,915,822 A | * | 6/1999 | Ogura et al. | 362/489 |
| 7,553,036 B2 | * | 6/2009 | Tsurumi | 362/29 |
| 2007/0186843 A1 | | 8/2007 | Tsurumi | |

FOREIGN PATENT DOCUMENTS

| | | |
|---|---|---|
| JP | 2005-145298 | 6/2005 |
| JP | 2006-162569 | 6/2006 |

* cited by examiner

*Primary Examiner*—Stephen F Husar
(74) *Attorney, Agent, or Firm*—Nixon & Vanderhye PC

(57) ABSTRACT

A meter has a liquid crystal display panel. The liquid crystal display panel is adapted to display a dial picture image thereon. A backlight illuminates the liquid crystal display panel. A movement is located in front of a front surface of the liquid crystal display panel. A semi-translucent panel covers the front surface of the liquid crystal display panel. A pointer is pivotably supported by the movement in such a manner that the semi-translucent panel is located between a pivotal trajectory plane of the pointer and the liquid crystal display panel. The semi-translucent panel enhances a contrast between the dial picture image and a background image displayed on the liquid crystal display panel.

8 Claims, 2 Drawing Sheets

US 7,722,202 B2

METER HAVING LCD PANEL AND POINTER

CROSS REFERENCE TO RELATED APPLICATION

This application is based on and incorporates herein by reference Japanese Patent Application No. 2008-004858 filed on Jan. 11, 2008.

BACKGROUND OF THE INVENTION

1. Field of the Invention

The present invention relates to a meter that is suitable for an installation on a vehicle, etc.

2. Description of Related Art

Recently, a meter that has a liquid crystal display (LCD) panel instead of a printed dial plate has been proposed. This is because an amount of information that the meter can indicate is greatly increased by using a LCD panel. In a case in which a LCD panel is used instead of a printed dial plate, it is difficult to form an opening on the LCD panel. Thus, in such a meter, a motor for moving a pointer is arranged on a front side of the LCD panel (see JP2006-162569A).

The LCD panel displays information by changing a translucency of a backlight. However, it is difficult to get the translucency perfectly zero, so that the LCD panel cannot display dark black color as a surface of the printed dial panel does. That is, because of a leakage of the backlight, the meter having the LCD panel has a problem that a contrast between a dial picture image and a background image is lower than a contrast on a printed dial plate that is transparently illuminated from a rear side.

SUMMARY OF THE INVENTION

The present invention is made in view of the above-mentioned problem. Thus, it is an objective of the present invention to provide a meter having a LCD panel and a pointer, which performs a high contrast indication and has an enhanced appearance.

To achieve the objective of the present invention, there is provided a meter that has a liquid crystal display panel. The liquid crystal display panel is adapted to display a dial picture image thereon. A backlight illuminates the liquid crystal display panel. A movement is located in front of a front surface of the liquid crystal display panel. A semi-translucent panel covers the front surface of the liquid crystal display panel. A pointer is pivotably supported by the movement in such a manner that the semi-translucent panel is located between a pivotal trajectory plane of the pointer and the liquid crystal display panel.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

A vehicle-mounted combination meter 100, which is one embodiment of a meter according to the present invention, will be described below, with reference to the accompanying drawings.

Figure 1:
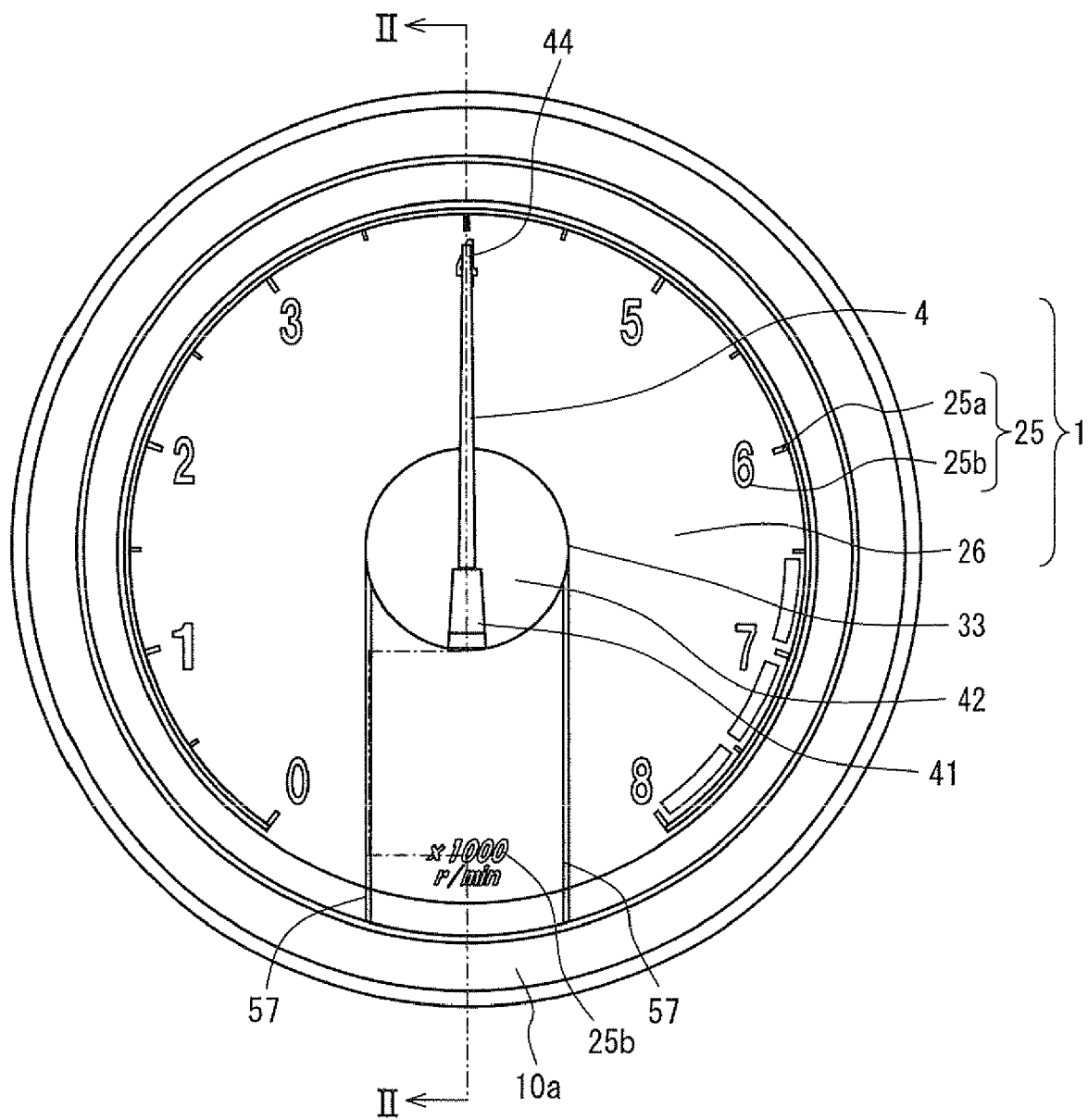
FIG. 1 is a front view showing a meter according to one embodiment of the present invention.
Figure 2:
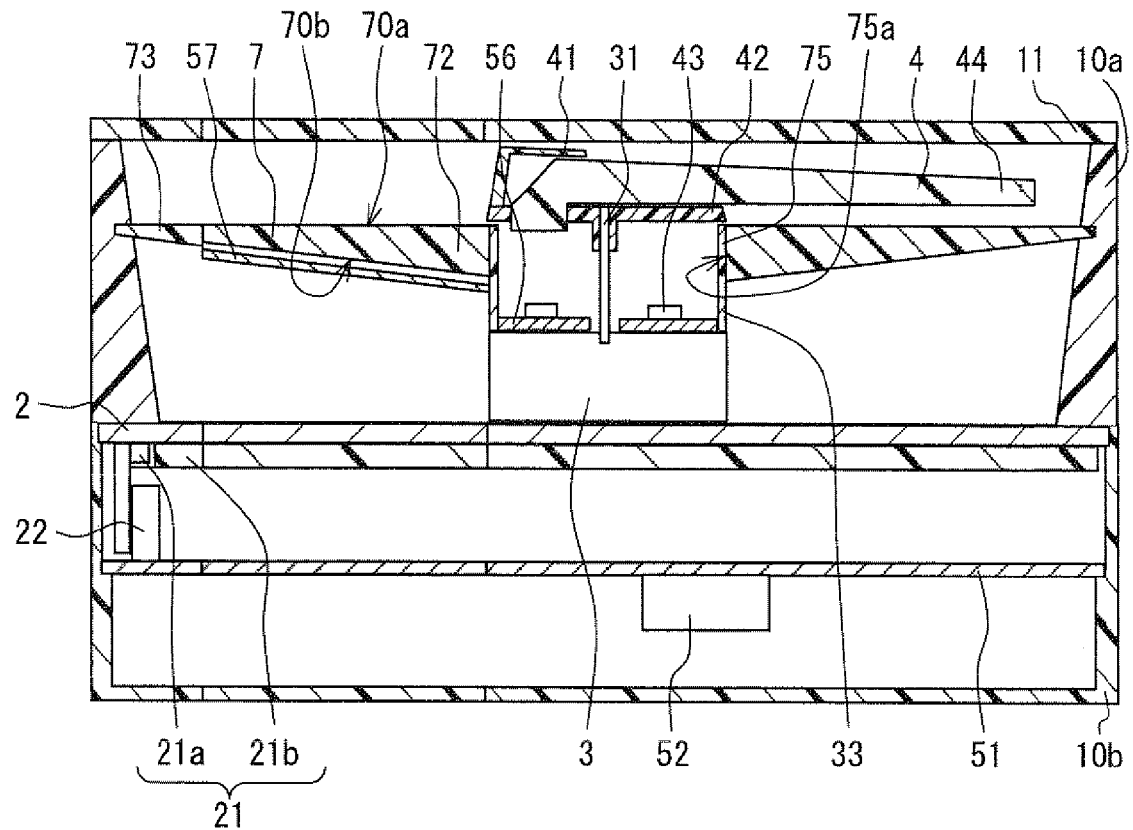
FIG. 2 is a cross-sectional view of showing the meter according to the one embodiment of the present invention, taken along a line II-II of FIG. 1.

FIG. 1 is a front view of the combination meter 100, which is the meter according to the one embodiment of the present invention. FIG. 2 is a cross-sectional view of the combination meter 100, which is taken along a line II-II of FIG. 1.

The combination meter 100 is installed in a certain position in front of a driver's seat of a vehicle to be visually recognized by a driver of the vehicle. The meter according to the present invention indicates various information related to a state of the vehicle. The combination meter 100 according to the one embodiment of the present invention provides an indication design 1 that indicates a rotational speed of a crankshaft of an internal combustion engine, which is mounted on the vehicle, with a pointer 4.

As shown in FIG. 1, the indication design 1 includes the pointer 4 that pivotally moves, a dial picture image 25 that is displayed on a liquid crystal display (LCD) panel 2 to indicate readings of a physical quantity that is pointed by the pointer 4, and a background image 26. The dial picture image 25 includes scale images 25a and character images 25b.

A construction of the combination meter 100 according to the one embodiment of the present invention will be described below, with reference to FIG. 2.

As shown in FIG. 2, the combination meter 100 has the LCD panel 2 that is provided with a backlight 21 on its rear side. A TFT (thin-film transistor) liquid crystal panel, which is a dot-matrix liquid crystal panel on which pixels are uniformly arranged in a grid pattern, is used for the LCD panel 2 to display various information thereon. The LCD panel 2 can display various images by controlling a transmittance of light that is emitted from the backlight 21 in accordance with externally applied voltage signals. In this embodiment, a lighting by the backlight 21 is performed by an edge light system in which a light of a white LED 21a is let in from an edge of a light guide plate 21b that is fabricated from a material having translucency such as resin. A cold cathode fluorescent lamp can also be used instead of the LED 21a.

The LCD panel 2 has a LCD control circuit 22 that controls an image display operation and lighting operation of the backlight 21. The LCD control circuit 22 is electrically connected with a first circuit board 51 that is located on the rear side (lower side in FIG. 2) of the LCD panel 2. A controller 52 that controls a movement 3 and a LED 43, which are described below, is mounted on the first circuit board 51.

As shown in FIG. 2, the movement 3 is arranged in a central part on a driver side (upper side in FIG. 2) of the LCD panel 2. A pointer shaft 31 extends out from the movement 3 to the driver side. A pointer base 42 that holds the pointer 4 is fixed at a tip of the pointer shaft 31 so that the pointer 4 can rotate integrally with the pointer shaft 31.

In a space between the movement 3 and the pointer base 42, a LED 43 that generates light to be introduced into the pointer 4 and a second circuit board 56 that has a wiring circuit for the LED 43 and the movement 3 are installed in a cylindrical support member 33.

The pointer 4 is fabricated from a translucent resin material, and a whole of the pointer 4 is illuminated by the light introduced from the LED 43. The pointer base 42 and the support member 33 are fabricated from a light shielding material. A bright white tone paint is applied to an inner surface of the support member 33 to raise light reflectivity. The pointer base 42 and the support member 33 form a construction that prevents the light of the LED 43 from leaking out and let the pointer 4 emit a light at higher brightness. A light-shielding cap 41 that is fabricated from a light shielding material covers an outer surface of a part of the pointer 4 at which the pointer 4 is fixed to the pointer base 42, to satisfy an appearance of the indication design 1. In this embodiment, a hue of the light of the LED 43 is red tone. However, a luminescent color of the LED 43 may be in other tones.

As shown in FIG. 2, a dark-colored disk like shaped semi-translucent panel 7 is arranged to be adjacent to a pivotal trajectory plane of a rear side (lower side in FIG. 2) of the pointer 4. Here, the pivotal trajectory plane is an imaginary plane on which a line on the rear side of the pointer 4 moves. This dark-colored semi-translucent panel 7 is fabricated from a material which is a blend of a clear colorless resin, etc. and a light scattering fine powder admixture. A translucency of the semi-translucent panel 7 is adjusted in accordance with a quantity of the fine powder admixture. Moreover, the dark-colored semi-translucent panel 7 has an approximately wedge-shaped cross section a thickness of which is gradually decreased as going from its inner circumferential portion 72 to its outer circumferential portion 73. By this construction, the semi-translucent panel 7 has a gradation in translucency, that is, the translucency of the semi-translucent panel 7 is gradually increased as going from the inner circumferential portion 72 to the outer circumferential portion 73. The gradation in translucency can also be formed by a printing that provides a varied translucency on a panel. The printing may be combined with the wedge-shaped cross section of a semi-translucent panel to form the gradation in translucency. By this construction, the translucency of the semi-translucent panel 7 can be varied even though the semi-translucent panel 7 is fabricated from a homogeneous material.

As shown in FIG. 2, a central portion of the dark-colored semi-translucent panel 7 has an opening 75 a diameter of which is slightly larger than a diameter of the movement 3. The above-mentioned support member 33, in which the LED 43 and the second circuit board 56 are installed, is fixed to and supported by an inner circumferential surface 75a of the opening 75 that is formed in the central portion of the dark-colored semi-translucent panel 7. Furthermore, the movement 3 is also supported by the second circuit board 56 that is fixed to the support member 33.

A cylindrical front case 10a, which constitutes a part of a case 10 of the combination meter 100, is arranged on a rim of the dark-colored semi-translucent panel 7. The dark-colored semi-translucent panel is supported by the front case 10a at its outer circumferential portion 73. Thereby, the movement 3 is supported by the front case 10a via the dark-colored semi-translucent panel 7, the support member 33 and the second circuit board 56.

By this construction, an extra support member for connecting the movement 3 with the front case 10a, which is adopted in a conventional meter in which a movement is arranged on a driver side of a LCD dial plate, can be eliminated. Thus, the indication design 1 is not obstructed by the extra support member to satisfy the appearance of the combination meter 100.

Moreover, the construction in which the front case 10a supports an entire circumference of the outer circumferential portion 73 of the dark-colored semi-translucent panel 7 enhances a support rigidity of the movement 3, to obtain a tolerance to a vibration that is a concern for vehicle-mounted apparatuses. In addition, the movement 3 can be more rigidly supported by mating the movement 3 with the LCD panel 2 and bonding mating faces of the movement 3 and the LCD panel 2 with an adhesive, etc. Moreover, a construction in which an elasticity of the dark-colored semi-translucent panel 7 presses the movement 3 onto the LCD panel 2 can also be chosen. These constructions can prevent the combination meter 100 from making abnormal noises regardless of the vibration caused by the vehicle.

As shown in FIG. 2, a front panel 11 is joined to a driver side end face of the front case 10a. The front panel is fabricated, for example, from a transparent resin, etc., and has a high translucency.

The above-mentioned front case 10a and the front panel 11, and a rear case 10b constitute the case 10 of the combination meter 100. The front case 10a and the rear case 10b are fabricated from resin. The bottomed rear case 10b is in contact with a counter driver side end face of the front case 10a. The rear case 10b and the front case 10a catch the LCD panel 2 therebetween. The above-mentioned first circuit board 51 is installed in an inside of the rear case 10b. A circuit wiring 57 connects the first circuit board 51 with the second circuit board 56 to send control signals of the controller 52 to the movement 3 and the LED 43 and to supply electric power to the movement 3 and the LED 43. An electric conductor that forms the circuit wiring 57 is a flexible printed circuit board, a coated conducting wire, etc. As shown in FIG. 1, the circuit wiring 57, one end of which is connected with the second circuit board 56, is exposed to the driver side of the LCD panel 2 in a space between the support member 33 and the front case 10a. The circuit wiring 57 is wired through the front case 10a, and the other end of the circuit wiring 57 is connected with the first circuit board 51. As shown in FIG. 2, an exposed portion of the circuit wiring 57 that is exposed to the driver side of the LCD panel 2 is located on a rear side of the dark-colored semi-translucent panel 7, and is painted black. Thereby, the exposed portion of the circuit wiring 57 is not easily recognized by the driver, not to impair the appearance of the indication design 1.

Actions and effects of the dark-colored semi-translucent panel 7, which is a featured part in the construction of the combination meter 100 according to the one embodiment of the present invention, for the appearance of the combination meter 100 will be described below with reference to FIGS. 1 and 2.

As shown in FIG. 1, in the combination meter 100 according to the one embodiment of the present invention, the indication design 1 indicates a physical quantity, i.e., the rotational speed of the internal combustion engine, by letting the pivotally moving pointer 4 point the scale images 25a and the character images 25b that are displayed on the LCD panel 2. A display of this dial picture image 25 allows a transmission of the light from the backlight 21 on the rear side of the LCD panel 2, to be an image having a particularly high brightness. In contrast, the background image 26 shields the light from the backlight 21, to be an image having a low brightness.

In a conventional meter, a dial plate has a construction in which a printing such as a hot stamping is applied to a surface of a translucent resin panel to shield the panel except areas on which characters are printed. The characters are illuminated by lighting the panel from its rear side. By using the LCD panel 2 instead of the above-mentioned printed dial plate in the conventional meter, the combination meter 100 can display the scale images 25a and the character images 25b along a pivot path of a pointer tip 44 during a normal driving time of the vehicle, and can also display warning messages or navigation images on demand. Thereby, an amount of information that the combination meter 100 can indicate is greatly increased.

However, the LCD panel 2 has characteristics that the LCD panel 2 cannot display a perfectly black-colored image as the surface of the conventional printed dial plate can. This is because the LCD panel 2 cannot completely shield the light emitted from the backlight 21. More specifically, leakage of the light of the backlight 21 is caused by an imperfection in a polarization degree of polarizing filters (not shown) that are located on both sides of the LCD panel 2, scatterings of the polarized light at color filters (not shown), etc. Therefore, the LCD panel 2 itself cannot display a black-colored image having a low brightness for the background image 26 as compared with a background color of the conventional dial plate.

Thus, the meter just having the LCD panel 2 has a problem that an appearance of the indication design 1 is impaired because a contrast between the dial picture image 25 and the background image 26 of the indication design 1 is smaller than a contrast on the printed dial plate of the conventional meter. In contrast, in the combination meter 100 according to the one embodiment of the present invention, the dark-colored semi-translucent panel 7, which has a gradation in translucency, has an action that will be described below, to enhance the contrast of the dial picture image 25 in the indication design 1 to realize a good appearance of the indication design 1. This uses characteristics of human sense of sight that sensitively perceives a variation of a quantity of light in a dark region and insensitively perceives a variation of a quantity of light in a bright region.

The dial picture image 25, which is an image having a high brightness, is displayed on the LCD panel 2 by allowing a transmission of the light from the backlight 21. More specifically, only a light with a certain polarization angle passes through the polarizing plates or filters (not shown) among lights emitted from the backlight 21. However, human sense of sight does not perceive the polarization angle, and the polarization angle of the light has no influence on a visibility of the dial picture image 25. As shown in FIG. 1, the dial picture image 25 is displayed in a peripheral portion of the LCD panel 2 that is approximately aligned with the pivot path of the pointer tip 44 in a direction perpendicular to the LCD panel 2. As shown in FIG. 2, the dark-colored semi-translucent panel 7, which is arranged to be adjacent to the pivotal trajectory plane of the pointer 4, cuts off a part of the light that is emitted to the driver side from the dial picture image 25, to decrease a brightness of the dial picture image 25 a little. However, the outer circumferential portion 73 of the dark-colored semi-translucent panel 7 has a relatively small thickness, so that the outer circumferential portion 73 has a larger translucency than the central portion of the dark-colored semi-translucent panel 7 has. In addition, since human sense of sight insensitively perceives a variation of a quantity of light in a bright region as mentioned above, a change in brightness of the dial picture image 25 caused by the dark-colored semi-translucent panel 7 is perceived little.

In contrast, the background image 26, which is a black-colored image having a low brightness, is displayed on the LCD panel 2 by shielding the light from the backlight 21 on the rear side of the LCD panel 2. However, due to the above-mentioned reasons, the LCD panel 2 itself cannot perfectly shield the light from the backlight 21, and a weak light leaks from a display surface of the LCD panel 2. A radially inner portion of the dark-colored semi-translucent panel 7, which is located on a driver side of the background image 26, has a large thickness, so that the radially inner portion has a small translucency. Thereby, the dark-colored semi-translucent panel 7 cuts off the light that leaks from the background image 26 to the driver side, to decrease a brightness of the background image 26. In addition, as mentioned above, human sense of sight sensitively perceives a variation of a quantity of light in a dark region. As a result, the background image 26 can be perceived as a dark black-colored image having a lower brightness by interposing the dark-colored semi-translucent panel 7.

By using the above-mentioned light cutting effect of the dark-colored semi-translucent panel 7 and the characteristics of human sense of sight, it is possible to decrease an apparent brightness of the background image 26, keeping an apparent brightness of the dial picture image 25, so that the indication design 1 has a high contrast. Thereby, the indication design 1 of the combination meter 100 has a good appearance. Moreover, since the background image 26 occupies quite a large part of the indication design 1, a contrast enhancement by the dark-colored semi-translucent panel 7 can be more effective.

Moreover, as shown in FIG. 2, the movement 3 located on the rear side of the dark-colored semi-translucency panel 7 is hardly recognized by the driver of the vehicle. This is because the light reflected by an outer surface of the movement 3 hardly reaches the sight of the driver of the vehicle. Specifically, the light incident on the outer surface of the movement 3 is a light leaked from an area on the LCD panel 2 on which the black-colored background image 26 is displayed, and a quantity of the light is very small. Then, the light reflected on the outer surface of the movement 3 is cut off by the dark-colored semi-translucent panel 7, and hardly reaches the sight of the driver of the vehicle. This construction can resolve a bad appearance in which the movement 3 occupies a central portion of the indication design 1.

In addition, as mentioned above, the dark-colored semi-translucent panel 7 has the approximately wedge-shaped cross section a thickness of which is gradually decreased as going from the inner circumferential portion 72 to the outer circumferential portion 73. By the gradation construction in which the translucency of the semi-translucent panel 7 is gradually increased as going from the inner circumferential portion 72 to the outer circumferential portion 73, a difference between the translucency of the inner circumferential portion 72 and the translucency of the outer circumferential portion 73 is not perceived by the human sense of sight. By this construction, the dark-colored semi-translucent panel 7 has an effect to decrease the apparent brightness of the background image 26 in the inner circumferential portion 72 that has a low translucency while keeping the apparent brightness of the dial picture image 25 in the outer circumferential portion 73 that has a high translucency, and an effect to prevent human sense of sight from perceiving the movement 3, without causing unnatural feeling to the human sense of sight. Thereby, the indication design 1 has a high contrast, to enhance a quality of the appearance of the combination meter 100.

Moreover, as shown in FIG. 1, the pointer 4 is arranged closest to the driver among constituents of the indication design 1. The pointer 4, which emits a light in red tone by being illuminated by the LED 43 to have a high brightness and a high color saturation, pivotally moves on a front side of the black-colored background image 26 a brightness of which is decreased by the dark-colored semi-translucent panel 7. This construction forms the indication design 1 having a high contrast.

Furthermore, the pointer shaft 31 extends to the driver side to locate the pointer 4 on the driver side than the movement 3. Thus, a base end portion of the pointer 4 is not located behind the movement 3, and the indication design 1 includes a long face of the pointer 4 as shown in FIG. 1. Thereby, the pointer 4 having a high brightness and a high color saturation occupies a certain area in the indication design 1, to enhance the contrast of the indication design 1. Thereby, it is possible to enhance a quality of the appearance of the combination meter 100.

Next, an electric circuit construction of the combination meter 100 according to the one embodiment of the present invention will be described below, with reference to a schematic circuit diagram of FIG. 3.

Figure 3:
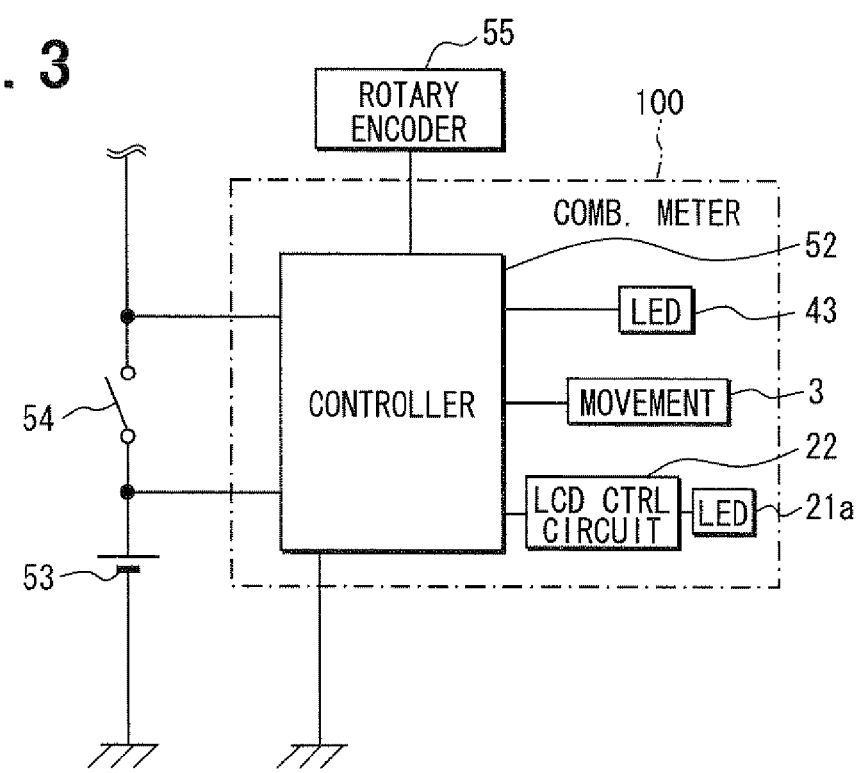
FIG. 3 is a block diagram showing an electric circuit configuration of the meter according to the one embodiment of the present invention.

As shown in FIG. 3, the controller 52 is always supplied with electric power from a battery 53. The controller 52 is connected with an ignition switch 54 to detect a switching state of the ignition switch 54.

The controller 52 is also connected with the LCD control circuit 22 to which the LED 21a, which is a light source of the backlight 21, is connected, and with the LED 43. In accordance with a detection result of the switching state of the ignition switch 54, the controller 52 performs a lighting control of the LED 43 and sends the detection result to the LCD control circuit 22. Thereby, the LCD control circuit 22 controls the lighting operation of the backlight 21 and the image display operation of the LCD panel 2.

Further, the controller 52 is also connected with the movement 3 and with a rotary encoder 55 that detects the rotational speed of the vehicle-mounted internal combustion engine. The controller 52 controls the movement 3 to rotate the pointer shaft 31 to respective rotational angles in accordance with an input signal sent from the rotary encoder 55.

When the driver turns on the ignition switch 54 to apply a voltage of the battery 53 to the controller 52 and the controller 52 detects that the ignition switch 54 is turned on, the controller 52 performs the lighting control of the LED 43 and starts supplying electricity to the LED 43, and sends the detection result of the switching state of the ignition switch 54 to the LCD control circuit 22. The LCD control circuit 22 receives the detection result, and starts supplying electricity to the LED 21a and starts the image display operation of the LCD panel 2. The LCD panel 2 displays the scale images 25a and the character images 25b as shown in FIG. 1, in accordance with the image display operation by the LCD control circuit 22. At this time, the scale images 25a and the character images 25b become luminous indications by applying a certain voltage to the LCD 21a. Further, the pointer 4 emits light by applying a predetermined voltage to the LED 43. In addition, in accordance with a detection signal sent from the rotary encoder 55, the controller 52 drives the movement 3 to rotate the pointer shaft 31 to a certain angle, i.e., to an angle corresponding to the rotational speed of the vehicle-mounted internal combustion engine. The indication design 1 that indicates the rotating speed of an internal combustion engine is formed in this manner.

When ignition switch 54 is turned off by the driver and the controller 52 detects that the ignition switch 54 is turned off, the controller 52 performs a turn off control for the LED 43 and stops supplying electricity to the LED 43, and sends the detection result of the switching state of the ignition switch 54 to the LCD control circuit 22. The LCD control circuit 22 receives the detection result, and stops supplying electricity to the LED 21a and stops driving the LCD panel 2. When the operation of the LCD panel 2 is stopped, the display of the scale images 25a and the character images 25b disappears, and the backlight 21 is turned off. A voltage applied to the LED 43 also becomes zero, so that the lighting of the pointer 4 is also turned off. In addition, the controller 52 stops driving the movement 3, and the pointer shaft 31 is rotated to an initial angle that indicates zero of the physical quantity.

Additional advantages and modifications will readily occur to those skilled in the art. The invention in its broader terms is therefore not limited to the specific details, representative apparatus, and illustrative examples shown and described.

What is claimed is:

1. A meter comprising:
   a liquid crystal display panel that is adapted to display a dial picture image thereon;
   a backlight that illuminates the liquid crystal display panel;
   a movement that is located in front of a front surface of the liquid crystal display panel;
   a semi-translucent panel that covers the front surface of the liquid crystal display panel; and
   a pointer that is pivotably supported by the movement in such a manner that the semi-translucent panel is located between a pivotal trajectory plane of the pointer and the liquid crystal display panel.

2. The meter according to claim 1, wherein the dial picture image is displayed in a bright color to be surrounded by an approximately black-colored background image.

3. The meter according to claim 2, wherein the movement is located between the semi-translucent panel and the liquid crystal display panel.

4. The meter according to claim 2, wherein:
   the dial picture image is displayed in a predetermined area on the liquid crystal display panel; and
   a translucency of a part of the semi-translucent panel, which faces the dial picture image, is higher than a translucency of a rest part of the semi-translucent panel, which faces the background image.

5. The meter according to claim 4, wherein:
   the dial picture image is displayed in a radially outer portion of the liquid crystal display panel; and
   the translucency of the semi-translucent panel is gradually increased as going from its radially inner side to its radially outer side.

6. The meter according to claim 5, wherein a thickness of the semi-translucent panel is gradually decreased as going from the radially inner side to the radially outer side.

7. The meter according to claim 3, further comprising a case that supports an outer circumferential portion of the semi-translucent panel, wherein the movement is supported by the semi-translucent panel.

8. The meter according to claim 2, further comprising a light source that generates a light, wherein:
   the pointer is made of a translucent material; and
   the light generated by the light source is introduced into the pointer to let the pointer emit the light.

* * * * *